(12) United States Patent
McRobbie et al.

(10) Patent No.: US 12,552,982 B2
(45) Date of Patent: Feb. 17, 2026

(54) TREATMENT OF SUBTERRANEAN FORMATIONS

(71) Applicant: INNOSPEC LIMITED, Ellesmere Port (GB)

(72) Inventors: Ian Malcolm McRobbie, Ellesmere Port (GB); William Trenholme, Ellesmere Port (GB)

(73) Assignee: INNOSPEC LIMITED, Ellesmere Port (GB)

( * ) Notice: Subject to any disclaimer, the term of this patent is extended or adjusted under 35 U.S.C. 154(b) by 0 days.

(21) Appl. No.: 18/759,148

(22) Filed: Jun. 28, 2024

(65) Prior Publication Data

US 2024/0352306 A1    Oct. 24, 2024

Related U.S. Application Data

(63) Continuation of application No. 17/429,783, filed as application No. PCT/GB2020/050309 on Feb. 11, 2020, now Pat. No. 12,060,522.

(30) Foreign Application Priority Data

Feb. 12, 2019   (GB) ...................................... 1901921

(51) Int. Cl.
  *C09K 8/66*    (2006.01)
  *C09K 8/592*   (2006.01)
  *C09K 8/74*    (2006.01)

(52) U.S. Cl.
  CPC .............. *C09K 8/665* (2013.01); *C09K 8/592* (2013.01); *C09K 8/74* (2013.01)

(58) Field of Classification Search
  CPC ........ E21B 43/26; E21B 43/25; E21B 43/263; E21B 43/27
  See application file for complete search history.

(56) References Cited

U.S. PATENT DOCUMENTS

| | | | |
|---|---|---|---|
| 3,273,643 A * | 9/1966 | Billings et al. | C09K 8/94 175/69 |
| 3,288,658 A | 11/1966 | Ferguson et al. | |
| 3,449,181 A | 6/1969 | Armantrout et al. | |
| 3,660,182 A | 5/1972 | Cook et al. | |
| 3,839,107 A | 10/1974 | Clark et al. | |
| 4,055,449 A | 10/1977 | Wasson | |
| 4,274,893 A | 6/1981 | Mars et al. | |
| 4,294,633 A | 10/1981 | Clay | |

(Continued)

FOREIGN PATENT DOCUMENTS

| | | |
|---|---|---|
| CA | 2689187 A1 | 6/2010 |
| CN | 1554725 A | 12/2004 |

(Continued)

OTHER PUBLICATIONS

Translation of RU 2197606 C1 (Year: 2003).*

(Continued)

*Primary Examiner* — Angela M DiTrani Leff
(74) *Attorney, Agent, or Firm* — Jason A. Smith; Shumaker, Loop & Kendrick, LLP (57) ABSTRACT

A method of treating a subterranean formation by contacting the formation with the following (a) ammonium bicarbonate; (b) an oxidizing agent selected from a perchlorate or a nitrite or combinations thereof; and (c) an acid (AA).

21 Claims, 4 Drawing Sheets

(56) References Cited

U.S. PATENT DOCUMENTS

| | | | |
|---|---|---|---|
| 4,294,663 A | 10/1981 | Tennyson | |
| 4,572,296 A | 2/1986 | Watkins | |
| 4,580,633 A | 4/1986 | Watkins et al. | |
| 4,846,277 A * | 7/1989 | Khalil | C09K 8/703 166/280.1 |
| 11,739,256 B2 | 8/2023 | McRobbie et al. | |
| 11,753,583 B2 * | 9/2023 | McRobbie | C09K 8/665 166/300 |
| 11,987,751 B2 * | 5/2024 | McRobbie | E21B 43/2405 |
| 12,060,522 B2 * | 8/2024 | McRobbie | C06D 5/10 |
| 2009/0110609 A1 | 4/2009 | Roscioli | |
| 2010/0122815 A1 | 5/2010 | Zamora et al. | |
| 2013/0126169 A1 | 5/2013 | Al-Nakhli et al. | |
| 2014/0144632 A1 | 5/2014 | Zavolzhski et al. | |
| 2014/0144639 A1 | 5/2014 | Nguyen et al. | |
| 2015/0175879 A1 * | 6/2015 | Al-Nakhli | C09K 8/62 166/300 |
| 2015/0361328 A1 * | 12/2015 | Almutairi | E21B 43/24 166/300 |
| 2016/0244659 A1 * | 8/2016 | Shahin | E21B 43/16 |
| 2016/0265326 A1 * | 9/2016 | Nguyen | E21B 43/267 |
| 2016/0266326 A1 | 9/2016 | Gniadek | |
| 2016/0376884 A1 * | 12/2016 | Al-Nakhli | E21B 47/06 166/300 |
| 2017/0081584 A1 | 3/2017 | Shahin et al. | |
| 2018/0209240 A1 | 7/2018 | Gupta | |
| 2018/0291720 A1 | 10/2018 | Cairns et al. | |

FOREIGN PATENT DOCUMENTS

| | | | |
|---|---|---|---|
| CN | 101839127 A | | 9/2010 |
| CN | 104031625 A | | 9/2014 |
| CN | 104931436 A | | 9/2015 |
| CN | 105971573 A | * | 9/2016 |
| CN | 108561111 A | | 9/2018 |
| CN | 108690595 A | | 10/2018 |
| RU | 2197606 C1 | * | 1/2003 |
| RU | 2272897 C1 | | 3/2006 |
| RU | 2373385 C1 | | 11/2009 |
| RU | 2436828 C2 | | 5/2011 |
| RU | 2721200 C1 | | 5/2020 |
| WO | 2013/181229 A1 | | 12/2013 |
| WO | 2016065412 A1 | | 5/2016 |
| WO | 2016/126351 A1 | | 8/2016 |

OTHER PUBLICATIONS

Translation of CN 105971573 A (Year: 2016).*
International Search Report (ISR) for PCT/GB2020/050309 mailed Apr. 9, 2020 (4 pages).
Written Opinion for PCT/GB2020/050309 mailed Apr. 9, 2020 (8 pages).
International Search Report (ISR) for PCT/GB2020/050314 mailed Apr. 9, 2020 (4 pages).
Written Opinion for PCT/GB2020/050314 mailed Apr. 9, 2020 (6 pages).
International Search Report (ISR) for PCT/GB2020/050311 mailed Apr. 9, 2020 (4 pages).
Written Opinion for PCT/GB2020/050311 mailed Apr. 9, 2020 (8 pages).
International Search Report (ISR) for PCT/GB2020/050315 mailed Apr. 9, 2020 (4 pages).
Written Opinion for PCT/GB2020/050315 mailed Apr. 9, 2020 (7 pages).
Wikipedia, Ammonium bisulfate, retrieved Sep. 20, 2022 from https://en.wikipedia.org/wiki/Ammonium_bisulfate (Year: 2022).
PubChem, Compound Summary Sulfamic Acid, retrieved Sep. 20, 2022 from National Library of Medicine, https://puchem.ncbi.nlm.nih.gov/compound/Sulfamic-acid (Year: 2022).

* cited by examiner

TREATMENT OF SUBTERRANEAN FORMATIONS

TECHNICAL FIELD

This invention relates to treatment of subterranean formations, for example to fracture formations and/or stimulate hydrocarbon, for example oil and/or gas, production.

BACKGROUND

Oil and gas reserves trapped within low permeability reservoirs such as shale and tight-gas formations are difficult and expensive to recover using traditional methods. To maximise the production from such formations, an extensive and complex fracture network must be created. One of the most commonly employed methods is hydraulic fracturing. Whilst hydraulic fracturing does create fractures, the extent and complexity of the fracture patterns may be insufficient to maximise oil recovery and furthermore using high volumes of fracturing fluids is costly and can damage formations. Thus, there is a need for additional methods to further increase the productivity of an oil producing well, for example a hydraulically fractured well. A suitable method of a secondary fracturing operation generates new (micro) fractures, extends existing (micro)fractures or opens up naturally occurring fractures. This secondary fracturing method increases the complexity of the fracture network and stimulated reservoir volume (the total volume of reservoir rock that has been fractured).

The present invention is based, in preferred embodiments, on the treatment, for example fracturing, of subterranean formations by use of a mixture of chemicals which are arranged to rapidly produce large quantities of gas underground, especially resulting from an exothermic reaction. The combination of heat and gas can be used to treat, for example fracture, the formation. The combination of heat and gas may create new fractures, extend existing fractures, open up naturally occurring fractures or create microfractures within a fracture. In preferred embodiments, the mixture of chemicals generates large gas volumes per mole of reactants in the mixture and releases non-toxic by-products.

It is known to generate heat and gas in downhole operations for use in a secondary fracturing operation. However, known methods produce a limited amount of gas. The pressures experienced within the formation means that a large amount of gas needs to be generated to produce a pressure sufficient to overcome the confining pressure within the wellbore.

SUMMARY

Preferred embodiments of the following invention provide a means of increasing the amount of gas that can be rapidly generated by a chemical system, in order to generate a sufficient pressure within the formation to overcome the confining pressure and fracture the formation

DETAILED DESCRIPTION

It is an object of the present invention to address problems associated with fracturing and/or stimulation of formations.

According to a first aspect of the invention, there is provided a method of treating a subterranean formation, the method comprising contacting the formation with the following:

(a) ammonium bicarbonate;
(b) an oxidizing agent selected from a perchlorate or a nitrite or combinations thereof; and
(c) an acid (AA).

A preferred perchlorate is an alkali metal perchlorate with sodium perchlorate being especially preferred.

Preferably, said oxidizing agent is selected from a perchlorate or a nitrite; and, more preferably, said oxidizing agent comprises a perchlorate or a nitrite, but not both.

Preferably, as between a perchlorate and nitrite, a nitrite is preferred. Said nitrite is preferably arranged to provide nitrite ions in aqueous solution.

Said nitrite may be selected from alkali metal nitrites, alkaline earth metal nitrites, ammonium nitrite or organic nitrites. Said nitrite is preferably selected from lithium nitrite, sodium nitrite, potassium nitrite, calcium nitrite, magnesium nitrite, ammonium nitrite and combinations thereof. Said nitrite is preferably sodium nitrite.

Said ammonium bicarbonate and said oxidizing agent, especially said nitrite, are preferably contacted so that they react and nitrogen and carbon dioxide are generated in the formation.

A ratio (A) is defined as the number of moles of ammonium bicarbonate divided by the number of moles of nitrite contacted with the formation and/or reacted in the formation. There is no minimum or maximum amount of nitrite required for the invention and so ratio (A) may be any value greater than 0. Ratio (A) may be from 0.1 to 2.0, for example 0.2 to 0.8; and preferably ratio (A) is 0.3 to 0.6.

The method suitably comprises contacting the formation with said ammonium bicarbonate, said oxidizing agent, especially said nitrite, and said acid (AA). Said acid (AA) may be a monoprotic acid, a salt of a monoprotic acid, a polyprotic acid, a partial salt of a polyprotic acid, or a salt of a polyprotic acid.

Said acid (AA) may suitably be any water soluble Brønsted acid.

Said acid (AA) may be a mineral acid, an inorganic acid or an organic acid.

Acid (AA) may be selected from: HCl, HF, formic acid, lactic acid, phosphoric acid, sulfamic acid, ammonium bisulphate, acetic acid, oxalic acid, nitric acid, carbonic acid, nitrous acid, sulphuric acid, citric acid, propionic acid, lactic acid, trihaloacetic acids and acid precursors that provide the acid under wellbore conditions such as anhydrides, salts of trihaloacetic acid for example ammonium trichloroacetate, or esters like triacetin, methyl acetate, or dimers, oligomers or polymers of hydroxy acids such as lactic acid. Acid (AA) may be selected from: HCl, sulfamic acid and ammonium bisulphate or mixtures thereof.

In one preferred embodiment, acid (AA) is HCl.

Said acid (AA) is preferably arranged to react, for example with other materials contacted with the formation (e.g. with ammonium bicarbonate and/or nitrite), to produce a gas, wherein suitably the gas produced includes carbon or, especially, nitrogen atoms originating in the acid (AA). Thus, the method is preferably a method of treating a subterranean formation to generate gas within the formation. The gas may be arranged to fracture the formation in a region adjacent to, or within an area where said gas is produced.

Reference herein to a gas is intended to cover products which are gaseous at standard temperature and pressure (STP) (0° C. and 1 atm).

Preferably, said gas produced by reaction of said acid (AA) as aforesaid may be a nitrogen atom containing gas (e.g. $N_2$) or a carbon atom containing gas (e.g. $CO_2$).

Thus, by use of acid (AA) as aforesaid, the acid can be treated to produce gas which can supplement gas produced by reaction of said ammonium bicarbonate and said nitrite.

Preferably, said acid (AA) includes a nitrogen-atom.

Preferably, said acid (AA) includes a moiety

I for example a moiety

II or a moiety

III

Said acid (AA) may include a $NH_2$ moiety such as found in sulfamic acid or in ammonium bisulfate (e.g. wherein the $NH_2$ moiety is part of a $NH_4^+$ ion).

Said acid (AA) is preferably selected from sulfamic acid and ammonium bisulfate. A mixture of acids, for example the aforesaid acids may be selected.

The effectiveness of the treatment described may be dependent upon the total moles of acid used relative to other reagents. A ratio (B) defined as the number of moles of ammonium bicarbonate divided by the total number of moles of acid contacted with the formation and/or reacted with bicarbonate and oxidizing agent, preferably nitrite, in the formation may be greater than 0 and may be 10 or less. Ratio (B) may be in the range, 0 to 10, for example, 0.01 to 4, suitably 0.05 to 2, preferably, 0.1 to 1.1, and especially in the range 0.3 to 0.6.

The total number of moles of acid may comprise the sum of the number of moles of acid (AA) and any other acid contacted with the formation and/or reacted with bicarbonate and nitrite in the formation.

In a preferred embodiment, acid used in the treatment may itself donate atoms (other than hydrogen atoms) to a gas generated in the method. A ratio (C) defined as the number of moles of ammonium bicarbonate divided by the sum of the number of moles of one or more acids which are arranged to react, for example with other materials contacted with the formation, to donate atoms (other than hydrogen atoms) to gas (e.g. nitrogen) produced in the method may be greater than 0 and may be 10 or less. Ratio (C) may be in the range, 0 to 10, for example, 0.01 to 4, suitably 0.05 to 2, preferably, 0.1 to 1.1, and especially in the range 0.3 to 0.6.

In order to donate atoms (other than hydrogen atoms) to a gas produced, the acid may include a nitrogen atom. A ratio (D) defined as the number of moles of ammonium bicarbonate divided by the sum of the number of moles of one or more acids (contacted with the formation and/or reacted with bicarbonate and nitrite in the formation) which include a nitrogen atom, for example a $NH_2$ moiety as described, may be greater than 0 and may be 10 or less. Ratio (D) may be in the range, 0 to 10, for example, 0.01 to 4, suitably 0.05 to 2, preferably, 0.1 to 1.1, and especially in the range 0.3 to 0.6.

Preferred acids which donate atoms to a gas as described may be sulfamic acid and ammonium bisulfate. A ratio (E) defined as the number of moles of ammonium bicarbonate divided by the sum of the number of moles of sulfamic acid and ammonium bisulfate (contacted with the formation and/or reacted with bicarbonate and nitrite in the formation) may be greater than 0 and may be 10 or less. Ratio (E) may be in the range, 0 to 10, for example, 0.01 to 4, suitably 0.05 to 2, preferably, 0.1 to 1.1, and especially in the range 0.3 to 0.6.

In one embodiment, a ratio (F) defined as the number of moles of ammonium bicarbonate divided by the number of moles of sulfamic acid (contacted with the formation and/or reacted with bicarbonate and nitrite in the formation) may be greater than 0 and may be 10 or less. Ratio (F) may be in the range, 0 to 10, for example, 0.01 to 4, suitably 0.05 to 2, preferably, 0.1 to 1.1, and especially in the range 0.3 to 0.6.

In another embodiment, a ratio (G) defined as the number of moles of ammonium bicarbonate divided by the number of moles of ammonium bisulphate (contacted with the formation and/or reacted with bicarbonate and nitrite in the formation) may be greater than 0 and may be 10 or less. Ratio (G) may be in the range, 0 to 10, for example, 0.01 to 4, suitably 0.05 to 2, preferably, 0.1 to 1.1, and especially in the range 0.3 to 0.6.

The effectiveness of the treatment may be dependent on the moles of acid relative to nitrite. A ratio (H) defined as the number of moles of nitrite divided by the total number of moles of acid (contacted with the formation and/or reacted with bicarbonate and nitrite in the formation) may be greater than 0, for example in the range 0.1-10, preferably 0.5-5.0, more preferably from 1.0-2.0 and especially from 1.3-1.7.

The total number of moles of acid may comprise the sum of the number of moles of acid (AA) and any other acid contacted with the formation and/or reacted with bicarbonate and nitrite in the formation.

As described for ratio (I), acid may donate atoms (other than hydrogen atoms) to a gas generated in the method. A ratio (I) defined as the number of moles of nitrite divided by the sum of the number of moles of one or more acids which are arranged to react, for example with other materials contacted with the formation, to donate atoms (other than hydrogen atoms) to gas (e.g. nitrogen) produced in the method may be greater than 0, for example in the range 0.1 to 10, preferably in the range 0.5 to 5.0, more preferably in the range 1.0 to 2.0 and, especially, is in the range 1.3 to 1.7.

As described for ratio (J), acids which include a nitrogen atom may be advantageous. A ratio (J) defined as the number of moles of nitrite divided by the sum of the number of moles of one or more acids (which are arranged to react, for example with other materials contacted with the formation, to produce a gas (e.g. nitrogen)) which include a nitrogen atom, for example a $NH_2$ moiety as described, may be greater than 0, for example in the range 0.1 to 10, preferably in the range 0.5 to 5.0, more preferably in the range 1.0 to 2.0 and, especially, is in the range 1.3 to 1.7.

As described, preferred acids may be sulfamic acid and ammonium bisulfate. A ratio (K) defined as the number of moles of nitrite divided by the sum of the number of moles of sulfamic acid and ammonium bisulfate (which are arranged to react, for example with other materials contacted with the formation, to produce a gas (e.g. nitrogen)) may be greater than 0, for example in the range 0.1 to 10, preferably in the range 0.5 to 5.0, more preferably in the range 1.0 to 2.0 and, especially, is in the range 1.3 to 1.7.

In one embodiment, a ratio (L) defined as the number of moles of nitrite divided by the number of moles of sulfamic acid (contacted with the formation and/or reacted with carbonate and nitrite in the formation) may be greater than 0, for example in the range 0.1 to 10, preferably in the range 0.5 to 5.0, more preferably in the range 1.0 to 2.0 and, especially, is in the range 1.3 to 1.7.

In another embodiment, a ratio (M) defined as the number of moles of nitrite divided by the number of moles of ammonium bisulphate (which are arranged to react, for example with other materials contacted with the formation, to produce a gas (e.g. nitrogen)) may be greater than 0, for example in the range 0.1 to 10, preferably in the range 0.5 to 5.0, more preferably in the range 1.0 to 2.0 and, especially, is in the range 1.3 to 1.7.

Thus, preferably, the acid does not simply catalyse another reaction, but rather is directly involved in gas generation by donating atoms other than hydrogen (e.g. by donation of nitrogen atoms) to the gas produced.

Said ammonium bicarbonate may be provided as a slurry, an emulsion or a solution. Said ammonium bicarbonate may be provided in water and the method may comprise selecting an aqueous solution of ammonium bicarbonate. The solution may be of any suitable concentration up to a saturated solution. Said ammonium bicarbonate may or may not be encapsulated, for example with an encapsulant arranged to delay reaction with the nitrite and/or acid (AA) on contact therewith. Said ammonium bicarbonate is preferably not encapsulated Said oxidizing agent, for example said nitrite may be provided as a slurry, an emulsion or a solution. Said nitrite may be provided in water and the method may comprise selecting an aqueous solution of said nitrite. The solution may be of any suitable concentration up to a saturated solution. Said nitrite may or may not be encapsulated, for example with an encapsulant arranged to delay reaction with the bicarbonate and/or acid (AA) on contact therewith. Said nitrite is preferably not encapsulated When the method includes use of acid (AA) as described, acid (AA) may be provided in water for example as a solution or slurry in water. Said acid (AA) may or may not be encapsulated, for example with an encapsulant arranged to delay reaction with the bicarbonate and/or nitrite on contact therewith. Said acid (AA) is preferably not encapsulated.

In addition to the production of gas as described, said method may also produce heat to facilitate treatment of the formation.

Said method of treating said subterranean formation may be used in any subterranean formation that may benefit from the gas or heat rapidly generated by the reaction, for example to facilitate hydrocarbon production. The method may comprise treatment of said subterranean formation in a drilling operation, a stimulation operation, a hydraulic stimulation operation, a sand control operation, a completion operation, a scale inhibiting operation, a water-blocking operation, a clay stabilizer operation, a foam fracturing operation, a frac-packing operation, a gravel packing operation, a wellbore strengthening operation, a sag control operation, an acidising operation, an alkaline treatment operation, deposit removing operation, a 'Huff and Puff' operation, in a process for inhibiting 'frac hits', a wellbore damage removal operation, clean-up of a perforation, reduction of the hydrostatic pressure of the well, free stuck coiled tubing and/or pipe, a reservoir re-pressurisation operation, a depletion control operation, for far-field hydraulic fracture diversion, to reduce proppant settling, to reduce sand settling, an operation for increasing fracture complexity, or a fracturing operation.

Said method of treating a formation may be a 'Huff and Puff' operation.

'Huff and Puff' is a process that re-pressurises the near well area of the reservoir and reducing the viscosity of the oil in the surrounding formation. The reduction in oil viscosity can be achieved by pressurising the reservoir with a gas or fluid, comprising carbon dioxide which dissolves into the oil and reduces its viscosity. The pressurisation of the reservoir may be achieved by using any of the gas-generating reactions according to the invention. A typical 'Huff and Puff' operation would comprise a first step (i) of placing the gas generating chemicals within the wellbore and reacting them until the desired pressure is reached and a second 'shut-in' step (ii) wherein the well is sealed. Said shut-in step may be a full day or overnight. Once the well is opened production can resume.

Said method of treating a subterranean formation may be a process for inhibiting 'frac hits'.

A 'frac hit' occurs when wells have been drilled in close proximity and fractures formed in the more recently drilled well grow into and through the production area of the older well and in some cases cause damages to the older well. Fractures preferentially propagate through the weaknesses within the formation and so increasing the pressure in and about the old well can divert and/or deflect the new fractures away from the older wells. The pressurisation of the older well can be achieved by contacting the ammonium bicarbonate, oxidising agent, especially said nitrite, and acid (AA) within the older wellbore. This may be carried out as a one off treatment or the ammonium bicarbonate, oxidising agent, especially said nitrite, and acid (AA), may be continuously injected to maintain a desired pressure.

Said method may comprise treatment of said subterranean formation, for example to fracture the formation or increase the complexity of a fracture network and/or stimulate hydrocarbon, for example oil and/or gas, production. By stimulate hydrocarbon production we mean, providing a method that improves the flow of hydrocarbons from the formation into the production well. More preferably, said method comprises treatment of said subterranean formation to fracture the formation or increase the complexity of a fracture network to facilitate hydrocarbon, for example oil and/or gas, production. For example, said method may extend an existing fracture, create new fractures or create microfractures extending out from a hydraulic fracture.

Preferably, said method is used in: a stimulation operation, a hydraulic stimulation operation, a 'Huff and Puff' operation, in a process for inhibiting 'frac hits', a wellbore damage removal operation, clean-up of a perforation, reduction of the hydrostatic pressure of the well, freeing stuck coiled tubing and/or pipe, a re-pressurisation operation, a depletion control operation, for far-field hydraulic fracture diversion, to reduce proppant settling, to reduce sand settling, an operation for increasing fracture complexity, or a fracturing operation.

Said method of treating a formation may comprise a wellbore damage removal operation.

Said method of treating a formation may be to free stuck coiled tubing and/or pipe.

Said method of treating a formation may comprise cleaning equipment, for example drilling equipment such as coil tubing underground. Gas produced may be arranged to clean equipment by the gas pressure blowing off oil and/or other solid/liquid contaminants from the equipment.

Said method of treating a formation may comprise a reservoir re-pressurisation operation.

Said method of treating a formation may comprise far-field hydraulic fracture diversion.

Said method of treating a formation may comprise reducing proppant settling.

Said method of treating a formation may comprise a stimulation operation.

In one embodiment, (a) ammonium bicarbonate described in (a) and an oxidizing agent selected from a perchlorate or a nitrite as described in (b) may be injected into different wellbores such that the reactants diffuse through the formation until they contact each other and react with each other within the formation. In this case, preferably, the wellbores are adjacent to each other. The pressure and concentrations of the reactants may suitably be selected to control where within the formation the reaction substantially occurs. This method of placing the reactants downhole may be used for a reservoir re-pressurisation operation, a depletion control operation, a damage removal operation or an operation for the far-field diversion of hydraulic fractures.

The subterranean formation may comprise a source rock comprising hydrocarbons (e.g., oil or natural gas) and may include shale, sandstone, limestone, or mixtures thereof. Said subterranean formation may be subsea.

Said method of said first aspect is preferably a method of treating said formation to stimulate the formation, for example to facilitate production of hydrocarbons, for example oil or gas from the formation. The method may comprise treating the formation to create or enhance a fracture in the formation. The method preferably comprises treatment of a formation which has already been fractured, wherein the method is arranged to enhance an existing fracture network and/or stimulate further hydrocarbon production from an existing formation.

The method may include introducing proppant and/or microproppant into the formation to enter fractures formed in the method. Proppant and/or microproppant may be included in a formulation introduced to the formation after the formation has been treated with said ammonium bicarbonate, oxidizing agent and optional other reagents as described.

The method may also include introducing the proppant and/or microproppant in one or more of the formulations used in said method, so as to prop any fractures or microfractures formed as a result of the method.

Said method may comprise introducing said ammonium bicarbonate, for example in aqueous solution, into the formation. Said ammonium bicarbonate may be directed towards a region of said formation it is desired to treat, for example fracture and/or stimulate. Said method may involve introducing said ammonium bicarbonate via an injection well. Coil-tubing (or the like) may be used to direct the ammonium bicarbonate towards said region.

Said method may comprise introducing said nitrite, for example in aqueous solution, into the formation. Said oxidizing agent, preferably said nitrite, may be directed towards a region of said formation it is desired to treat, for example fracture and/or stimulate. Said method may involve introducing said oxidizing agent, preferably said nitrite, into the subterranean formation, for example via a suitable well, such as an injection well. Said method may involve introducing said oxidizing agent, preferably said nitrite, into the production well. Coil-tubing (or the like) may be used to direct the oxidizing agent, preferably said nitrite, towards said region.

Said method may comprise introducing said acid (AA), for example in aqueous solution, into the formation. Said acid (AA) may be directed towards a region of said formation it is desired to treat, for example fracture and/or stimulate. Said method may involve introducing said acid (AA), via an injection well. Coil-tubing (or the like) may be used to direct the acid (AA) towards said region.

In some embodiments of the method, said ammonium bicarbonate and said oxidizing agent, preferably said nitrite, are preferably not contacted with one another above ground. They are preferably contacted underground, during passage towards, or preferably adjacent to or within the region of said formation it is desired to treat.

In other embodiments, it may be desirable to contact ammonium bicarbonate and oxidizing agent, preferably nitrite, above ground and suitably taking a step to eliminate or minimise reaction between the reagents. Such a step may comprise controlling the pH of a formulation of ammonium bicarbonate and oxidizing agent, preferably nitrite. Such control may involve inclusion of an alkali in the formulation of ammonium bicarbonate and oxidizing agent, preferably nitrite, to increase and maintain the pH within a range where the ammonium bicarbonate and oxidizing agent, preferably nitrite do not react. For example, the pH may be greater than 7, for example at least 8.

In the method, acid (AA) is preferably not contacted with said ammonium bicarbonate and oxidizing agent, preferably said nitrite, above ground. It is preferably contacted with said ammonium bicarbonate and/or nitrite underground, preferably within and/or adjacent to the region of said formation it is desired to treat.

In the method, for example in fracturing of a formation by production of gas within the formation, the sum of the wt % of a formulation (F1) (e.g. an aqueous formulation) comprising said ammonium bicarbonate, a formulation (F2) (e.g. an aqueous formulation) comprising said oxidizing agent, preferably said nitrite, a formulation (F3) (e.g. an aqueous formulation) comprising said acid (AA) introduced into the formation is at least 80 wt %, preferably at least 90 wt %, more preferably at least 98 wt % of the total weight of materials introduced into the formation as part of the fracturing of the formation by production of gas within the formation, as described. For the avoidance of doubt, the aforementioned sum of the wt % is not intended to include a formulation (eg an inert spacer) which may be introduced into the formation (and may contact formulation (F1), (F2) and/or (F3)) but which does not include an active ingredient which is involved in production of gas in the formation as described herein.

In another embodiment of the method, for example in fracturing of a formation by production of gas within the formation, the sum of the wt % of a formulation (F3) (e.g. an aqueous formulation) comprising said acid (AA) and a formulation (F4) (e.g. an aqueous formulation) comprising said ammonium bicarbonate, said oxidizing agent, preferable said nitrite and an alkali, introduced into the formation is at least 80 wt %, preferably at least 90 wt %, more preferably at least 98 wt % of the total weight of materials introduced into the formation as part of the method of treating of the formation by production of gas and/or heat within the formation, as described in the first aspect. For the avoidance of doubt, the aforementioned sum of the wt % is not intended to include a formulation (eg an inert spacer) which may be introduced into the formation (and may contact formulation (F3) and/or (F4)) but which does not include an active ingredient which is involved in production of gas in the formation as described herein.

The sum of the wt % of ammonium bicarbonate and water in formulation (F1), when introduced into the formation, is suitably at least 80 wt %, preferably at least 90 wt %, more preferably at least 95 wt %.

The sum of the wt % of oxidizing agent, preferably said nitrite, and water in formulation (F2), when introduced into the formation, is suitably at least 80 wt %, preferably at least 90 wt %, more preferably at least 95 wt %.

The sum of the wt % of acid (AA) and water in formulation (F3), when introduced into the formation, is suitably at least 80 wt %, preferably at least 90 wt %, more preferably at least 95 wt %.

The sum of the wt % of ammonium bicarbonate, oxidising agent, preferably said nitrite, alkali and water in formulation (F4), when introduced into the formation, is suitably at least 80 wt %, preferably at least 90 wt %, more preferably at least 95 wt %.

Any of formulations (F1), (F2), (F3) and (F4) may comprise additional components commonly used in the treatment of subterranean formations for example: biocides, breakers, corrosion inhibitors, co-solvents, cross-linking agents, fluid loss control additives, friction reducers, iron control agents, oxygen scavengers, pH adjusting agents, proppants, microproppants, salts, scale inhibitors, surfactants, sulfide scavengers, viscosifying agents, clay stabilisers and the like.

Co-solvents may be used in any of formulations (F1), (F2), (F3) and (F4) to improve the solubility of the reagents in water and/or the thermodynamic stability of the solution. The co-solvents are preferably polar solvents for example: alcohols, glycols, amides, esters, ketones, sulfoxides etc. Suitably, the co-solvents are methanol or formamide or mixtures thereof. Specific examples may be selected from methanol and/or formamide.

Any suitable method may be used to place reagents into a well and/or deliver to a desired position in a formation. The well may be a horizontal or vertical well. However, preferred methods keep selected reagents isolated from each other until they reach the desired location within the formation.

Coiled tubing may be used to place reagents downhole. In this case, the end of the tube is placed where gas generation is required. One solution is pumped through the tubing and another solution along the casing. For example, Formulation (F3) may be pumped through the coil and formulation (F4) may be pumped along the casing.

Coiled tubing may be especially useful to place the reagents downhole in: a fracturing operation, a perforation clean-up operation, a wellbore damage removal operation, an operation to reduce the hydrostatic pressure of a well, or to free stuck coiled tubing and/or pipe.

Spacers may be used to keep the reagents and/or compositions separate until they reach a desired position in the formation. In this technique, a fluid, preferably an inert fluid, would used to separate the two formulations of reactive components. Typically with this technique, 5-10 bbl of the inert fluid may be used. Examples of inert fluids suitable for this technique include, but are not limited to, water and oil.

In one embodiment, the formulations (F1), (F2) and (F3) are introduced, in any order, with an inert spacer separating each of the formulations. Formulation (F3) may be used as a spacer to separate formulations (F1) and (F2), In another embodiment formulations (F3) and (F4) may be introduced into the formulations with an inert spacer separating the two formulations.

Spacers may be used to place the formulations downhole in the following operations: reservoir re-operation, a depletion control operation, a damage removal operation, for far-field hydraulic fracture diversion, a fracturing operation, to reduce sand or proppant settling.

The formulations may be provided as part of an emulsion, for example water-in-oil emulsions or double emulsions, for example water-in-oil-in-water. In a double emulsion, the inner water phase may be a formulation e.g. (F3) and the outer water phase may be a different formulation e.g. (F4).

In preferred embodiments described herein, the number of moles of gas generated per mole of reactants may be increased compared to prior art proposals.

The sum of the total weight in grams (g) of ammonium bicarbonate, oxidizing agent, preferably said nitrite, and acid(s) (including or consisting of acid (AA)) introduced into the formation is herein referred to as SUM-W. The sum of the total volume of gas (e.g. $CO_2$ and/or $N_2$) in $cm^3$ generated by reaction of ammonium bicarbonate, oxidizing agent, preferably said nitrite, and said acid(s) is herein referred to as SUM-V. Preferably, in the method, the Reaction Efficiency is defined as the volume of gases produced divided by the weight of reactants (ie SUM-V divided by SUM-W). The Reaction Efficiency is suitably at least 100 $cm^3/g$, for example 150 $cm^3/g$, 200 $cm^3/g$, preferably at least 240 $cm^3/g$, more preferably at least 260 $cm^3/g$ and, especially it is at least 270 $cm^3/g$. It may be less than 300 $cm^3/g$.

The Reaction Efficiency as described may suitably be calculated based on weights of the specified reagents selected and the volume of gas generated by reaction thereof in a reaction carried out under controlled conditions at the surface, based on amounts of reagents which are to be introduced into the formation, since measurements within the formation itself are not practical. Values referred to are suitably measured at STP, unless otherwise stated.

To minimise the quantity of one or more of the formulations leaking off into the formation and to maximise the fracturing effect, it is desirable that the gas is rapidly generated after the components have been contacted with each other. The gas generation may substantially be complete within 10 minutes of all the components being contacted with each other. Preferably, the gas generation is substantially complete within 5 minutes of the components being contacted with each other.

The quantities of formulations introduced into the formation as part of the method may be suitably selected dependent on the features of the formation, for example the confining pressure, and the pressure required to achieve the desired effect of said method of treating said formation. Thus, it is anticipated that any quantity of the formulations may be used. However, preferably at least 1 bbl may be used, for example 10 to 500 bbl, or from 100 to 350 bbl, preferably from 150 to 250 bbl.

The rate at which one of more of the fluids is injected may suitably be adjusted according to the method of treating the formation and the method of delivering the components. For example, it may be injected at a rate sufficient to build up a pressure such as that it fractures the formation.

In some methods of treating a subterranean formation, it may be preferable to generate pulses of higher and lower pressures within the formation. This effect may be achieved by repeatedly reacting a gas producing formulation within the formation. Either mechanical, chemical or combinations of mechanical and chemical methods may be used to control the manner in which the formulations are contacted with the formation to produce a series of pressure pulses. Said pulses of pressure may be created in treating a subterranean formation in a method comprising:
(i) introducing a first gas producing formulation into the formation so the formulation produces a gas in the formation;
(ii) reducing the rate of gas production within the formation, so the pressure produced in this step is lower than in step (i) and may be 0;
(iii) introducing a second gas producing formulation into the formation, which formulation may be the same or different to the first gas producing formulation, thereby to produce a pressure higher than in step (ii); and, optionally,
(iv) reducing the rate of introduction of said second gas producing formulation into the formation.

Steps (ii) and (iii) may be suitably repeated to produce further pressure pulses as required.

Steps (i) through to (iv) may be carried out continuously, intermittently or a mixture of continuously and intermittently.

In step (ii), the reduction of rate of gas production in the formation may be achieved mechanically, for example by reducing or stopping the amount of one or more gas generating reagents being introduced into the formation.

Step (ii) may be achieved using chemical means. For example, in one embodiment, step (ii) may be achieved by pumping an inert fluid e.g. a spacer in between the pumping of gas producing formulations. In another embodiment, step (ii) may be achieved by pumping an inert fluid concurrently with the first gas producing formulation, so as to reduce the concentration of the gas producing formulation and the rate at which the gas is produced. Then, step (iii) may comprise stopping the pumping of the inert fluid.

In some embodiments the gas generating reagents used in the gas producing formulation used in step (i) may be non-stoichiometric. In this case step (ii) may occur when one of the reagents (herein reagent (P)) is consumed so gas generation stops, leaving an excess of the remaining reagents (herein reagents (Q)). Step (iii) may then comprise injecting a formulation comprising an excess of reagent (P). Steps (i) to (iii) may be repeated with the injected formulations being alternated. For example the method may comprise contacting the formation with 20 bbl of a solution of ammonium compound and acid and 10 bbl of a solution of sodium nitrite in step (i). Step (ii) occurs when the 10 bbl of sodium nitrite is consumed. Step (iii) may comprise injecting 10 bbl or more of sodium nitrite to produce a second pressure pulse. If the method is to be repeated, step (iii) may use a large excess of sodium nitrite.

According to a second aspect of the invention, there is provided a mixture for treating a subterranean formation, the mixture comprising:
(a) ammonium bicarbonate;
(b) an oxidizing agent selected from a perchlorate or a nitrite, or combinations thereof; and
(c) an acid (AA).

The mixture is preferably produced below ground, for example within a subterranean formation.

The mixture may include one or more acids, for example including acid (AA).

The bicarbonate, oxidizing agent, preferably said nitrite, acid, including acid (AA), may be as described in the first aspect.

According to a third aspect of the invention, there is provided a collocation adjacent a subterranean formation and/or adjacent an injection well of a subterranean formation, wherein said collocation comprises (A) or (B) as described below:
(A) a formulation comprising ammonium bicarbonate (e.g. formulation (F1) of the first aspect), which is preferably provided in a receptacle (e.g. a receptacle (A));
a formulation comprising oxidizing agent, preferably a nitrite (e.g. formulation (F2) of the first aspect), which is preferably provided in a receptacle (e.g. a receptacle (B)); and, optionally (but preferably) a formulation comprising acid (AA) (e.g. formulation (F3) of the first aspect), which is preferably provided in a receptacle (e.g. a receptacle (C));
(B) a formulation comprising ammonium bicarbonate and an oxidising agent, preferably a nitrite (e.g. formulation (F4) of the first aspect) which is preferably provided in a receptacle (e.g. a receptacle (D)); and, optionally but preferably, a formulation comprising acid (AA) (e.g. formulation (F3) of the first aspect) which is preferably provided in a receptacle (e.g. a receptacle (C)).

The collocation suitably includes pipework for delivering the formulations into the subterranean formation. In one embodiment, receptacle (A) may communicate with a pipe (which may comprise coil tubing) arranged to deliver formulation (F1) into the formation. Receptacle (B) may communicate with a pipe (which may comprise coil tubing) arranged to deliver formulation (F2) into the formation. Receptacle (C) may communicate with a pipe (which may comprise coil tubing) arranged to deliver formulation (F3) into the formation. In another embodiment, receptacle (D) may communicate with a pipe (which may comprise coil tubing) arranged to deliver formulation (F4) into the formation; and in the same treatment. receptacle (C) may communicate with a pipe (which may comprise coil tubing) arranged to deliver formulation (F3) into the formation.

According to a fourth aspect, there is provided the use of the following for gas generation in a subterranean formation:
(a) ammonium bicarbonate;
(b) an oxidizing agent, preferably a nitrite; and,
(c) an acid (AA).

The number of moles of gas generated per mole of reactants may be increased compared to prior art proposals.

The use may be as described in the first aspect.

Any feature of any aspect of any invention or embodiment described herein may be combined with any aspect of any other invention or embodiment described herein mutatis mutandis.

BRIEF DESCRIPTION OF THE DRAWINGS

Specific embodiments of the invention will now be described, by way of example, with reference to the accompanying figures, in which.

A subterranean formation may be treated with reagents which are arranged to react to produce a gas and/or heat within the formation. This may stimulate the formation by improving a fracture network within the formation, for example by creating new fractures, extending existing fractures, opening up naturally-occurring fractures or creating microfractures. The examples which follow describe reagents which may be used in a treatment.

EXAMPLE 1—GENERAL PROCEDURE FOR UNDERTAKING REACTIONS

10 mmol of ammonium bicarbonate and a nitrite or perchlorate-containing compound were added to a round-bottom flask and dissolved in the minimum quantity of water. Suitable apparatus to measure gas released was arranged in position and the solution heated with stirring to 75° C. Once the solution had reached 75° C., a selected amount of acid also heated to 75° C. was injected into the reaction vessel. The quantity of gas generated was recorded.

EXAMPLES 2 AND 3—COMPARISON BETWEEN AMMONIUM BICARBONATE AND OTHER AMMONIUM COMPOUNDS

In order to compare use of ammonium bicarbonate with ammonium carbonate, ammonium bicarbonate was reacted with sodium nitrite and sulfamic acid in Example 2, and the gas volume determined. From this, the gas volume (cm³) per g of reactant was calculated to determine the Reaction Efficiency. For comparison purposes, in Examples 3a and 3b, the same reaction and assessment was undertaken wherein the ammonium bicarbonate was replaced with ammonium carbonate or ammonium chloride. The unbalanced equations for the reactions are as follows:

$NH_4HCO_3 + NaNO_2 + H_3NSO_3 \longrightarrow$ metal salt+ $N_2 + CO_2 + H_2O$ $(NH_4)_2CO_3 + NaNO_2 + H_3NSO_3 \longrightarrow$ metal salt+ $N_2 + CO_2 + H_2O$ $NH_4Cl + NaNO_2 + H_3NSO_3 \longrightarrow$ metal salt+ $N_2 + H_2O$ The table below details the results.

| Example No. | Nature of ammonium compound | Mmol of ammonium compound | Mmol of sodium nitrite | Mmol of acid | Gas volume/cm³ | Mass of reagents (g) | Reaction Efficiency/cm³ gas per g |
|---|---|---|---|---|---|---|---|
| 2 | Ammonium bicarbonate | 10 | 30 | 20 | 1360 | 4.80 | 283 |
| 3a (comparative) | Ammonium carbonate | 10 | 30 | 20 | 1230 | 4.97 | 247 |
| 3b (comparative) | Ammonium Chloride | 10 | 30 | 20 | 900 | 4.55 | 198 |

The table shows that use of ammonium bicarbonate (in Example 2) is advantageous, in terms of reaction efficiency as described, compared to use of carbonate (Example 3a) and ammonium chloride (Example 3b) under identical conditions.

In Examples 4 to 10, the general procedure of Example 1 was undertaken with a range of different acids.

EXAMPLE 4

12.5 ml of an aqueous solution containing ammonium bicarbonate (10 mmol) and sodium nitrite (25 mmol), was added to a round-bottom flask. Suitable apparatus to measure gas released was arranged in position and the solution heated with stirring to 75° C. Once the solution had reached 75° C., 1.67 mL of a 12 M aqueous solution of hydrochloric acid (20 mmol) heated to 75° C. was injected into the reaction vessel. The quantity of gas generated was recorded.

EXAMPLE 5

Example 4 was repeated using 2.4 mL of an 8.33M aqueous solution of ammonium bisulfate (20 mmol) as the acid.

EXAMPLE 6

Example 5 was repeated using 30 mmol of sodium nitrite and 9.5 ml of 2.11M aqueous solution of sulfamic acid (20 mmol) as the acid.

EXAMPLE 7

Example 5 was repeated using 8.0 ml or an aqueous solution of 1.457 g (15 mmol) of sulfamic acid and 0.576 g (5 mmol) of ammonium bisulfate as the acid. The molar ratio of sulfamic acid to ammonium bisulfate was 75:25.

EXAMPLE 8

Example 5 was repeated using, 6.0 mL of an aqueous solution containing 0.971 g sulfamic acid (10 mmol) and 1.511 g ammonium bisulfate (10 mmol), as the acid. The molar ratio of sulfamic acid to ammonium bisulfate was 50:50.

EXAMPLE 9

Example 5 was repeated using, 3.9 mL of an aqueous solution containing 0.486 g sulfamic acid (5 mmol) and 1.723 g ammonium bisulfate (15 mmol), as the acid. The molar ratio of sulfamic acid to ammonium bisulfate was 25:75.

EXAMPLE 10

Example 5 was repeated using, 2.8 mL of an aqueous solution containing 0.1942 sulfamic acid (2 mmol) and 2.072 g ammonium bisulfate (18 mmol), as the acid. The molar ratio of sulfamic acid to ammonium bisulfate was 10:90.

Figure 1:
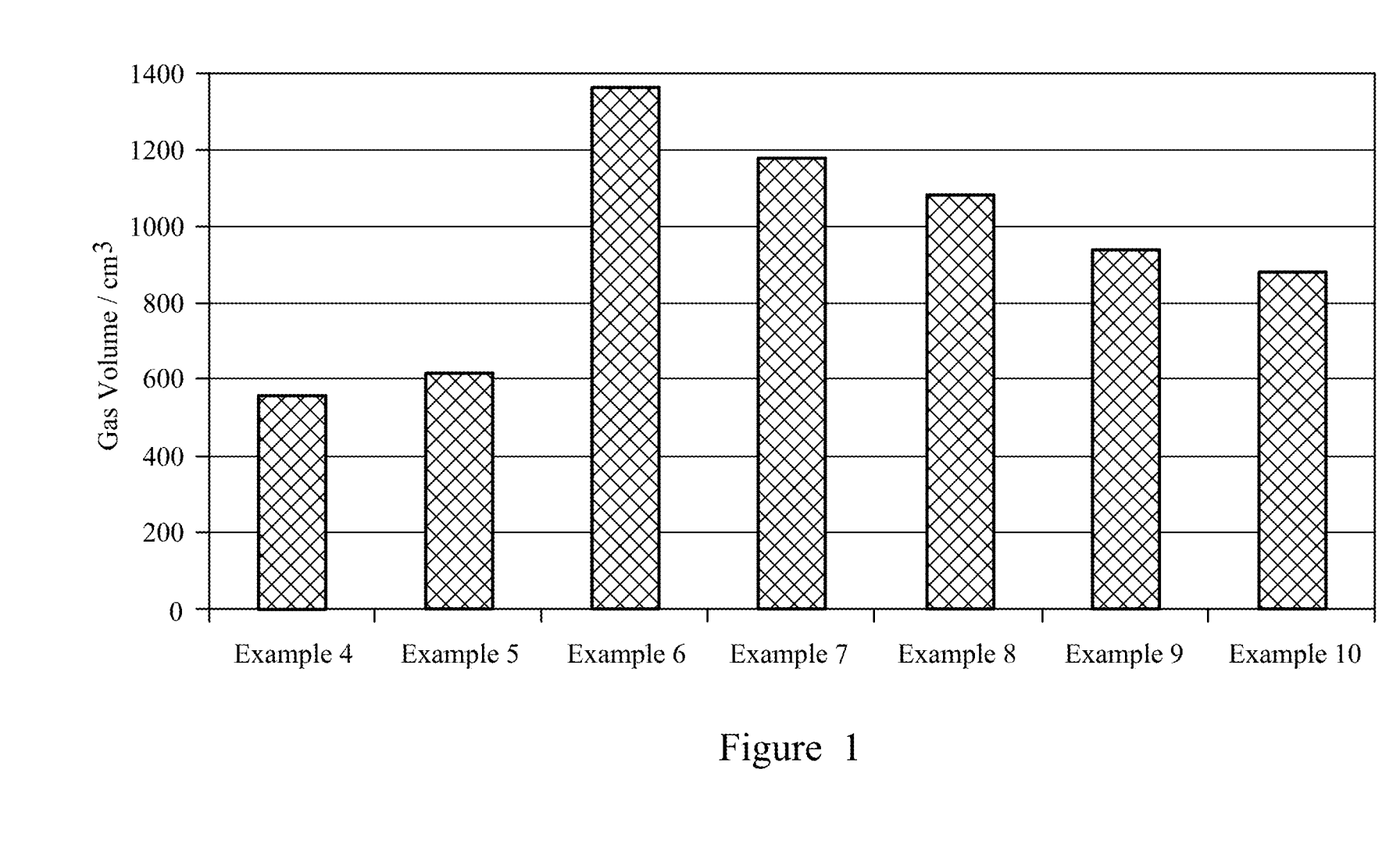
FIG. 1 is a graph showing gas volume generated for Examples 4 to 10.

The results for the gas volumes generated are shown in FIG. 1

EXAMPLES 11 TO 15

The reaction investigated, was the reaction between ammonium bicarbonate, sodium nitrite and HCl. The effect of varying the molar quantity of HCl was investigated using the general procedure described in Example 1.

A summary of the reagents used is provided in the table below.

| Example No. | Ammonium bicarbonate mmol | Sodium nitrite mmol | HCl mmol |
|---|---|---|---|
| 11 | 10 | 15 | 5 |
| 12 | 10 | 15 | 10 |
| 13 | 10 | 15 | 20 |
| 14 | 10 | 15 | 30 |
| 15 | 10 | 15 | 40 |

Figure 2:
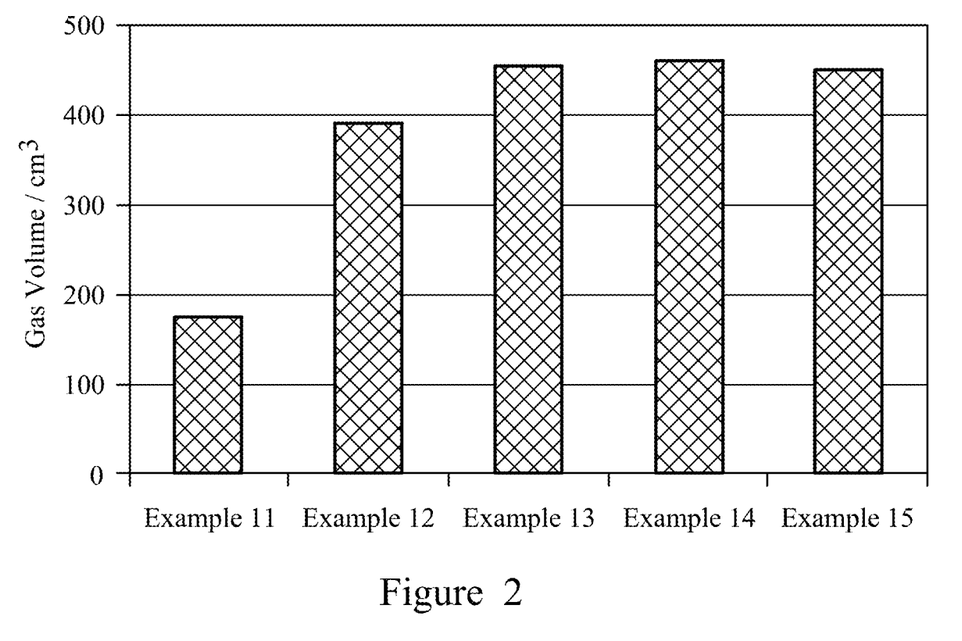
FIG. 2 is a graph showing gas volume generated for Examples 11 to 15.

Results are provided in FIG. 2 wherein it is clear that there is no significant difference in the gas volume observed when the amount of HCl is increased beyond 20 mmol. The preferred amount of HCl, in order to maximise the reaction efficiency, is taken to be 20 mmol which defines an ammonium bicarbonate to acid ratio of 1:2

In Examples 16 to 21, the effect of varying the molar quantity of sodium nitrite was investigated.

EXAMPLES 16 TO 21

The reaction investigated, using the general procedure described in Example 1, was repeated as described for Examples 11 to 15 except that the quantity of sodium nitrite was varied. A summary of the reagents used is provided in the table below.

| Example No. | Ammonium bicarbonate mmol | Sodium nitrite mmol | HCl mmol |
|---|---|---|---|
| 16 | 10 | 10 | 20 |
| 17 | 10 | 12.5 | 20 |
| 18 | 10 | 15 | 20 |
| 19 | 10 | 20 | 20 |
| 20 | 10 | 25 | 20 |
| 21 | 10 | 30 | 20 |

Figure 3:
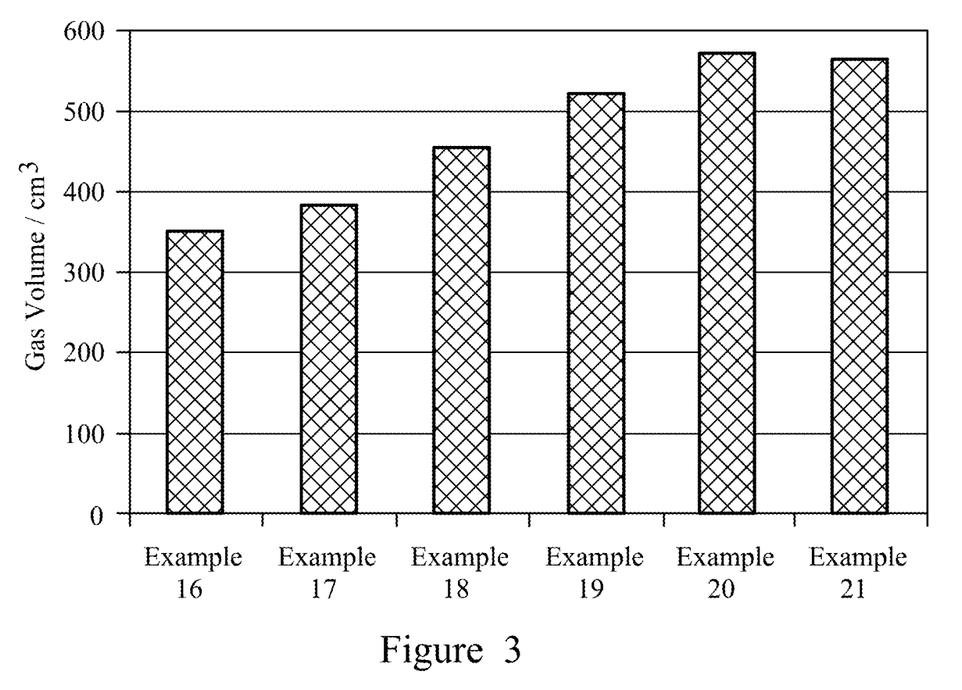
FIG. 3 is a graph showing gas volume generated for Examples 16 to 21.

Results are provided in FIG. 3 from which it is noted that there is no significant increase in gas release beyond 25 mmol NaNO$_2$. Therefore 25 mmol was chosen as the preferred quantity of nitrite for reaction efficiency reasons. The nitrite to ammonium ratio is 2.5:1; and the nitrite to acid ratio is 1.25:1.

In Examples 22 to 26, the effect of varying the molar quantity of sulfamic acid was investigated.

EXAMPLES 22 TO 26

The reaction investigated was the reaction between ammonium bicarbonate, sodium nitrite and sulfamic acid. The effect of changing the quantities of sulfamic acid was investigated, using the general procedure described in Example 1.

A summary of reagents used is provided in the table below:

| Example No. | Ammonium bicarbonate mmol | Sodium nitrite mmol | Sulfamic acid mmol |
|---|---|---|---|
| 22 | 10 | 10 | 5 |
| 23 | 10 | 10 | 7.5 |
| 24 | 10 | 10 | 10 |
| 25 | 10 | 10 | 20 |
| 26 | 10 | 10 | 25 |

Figure 4:
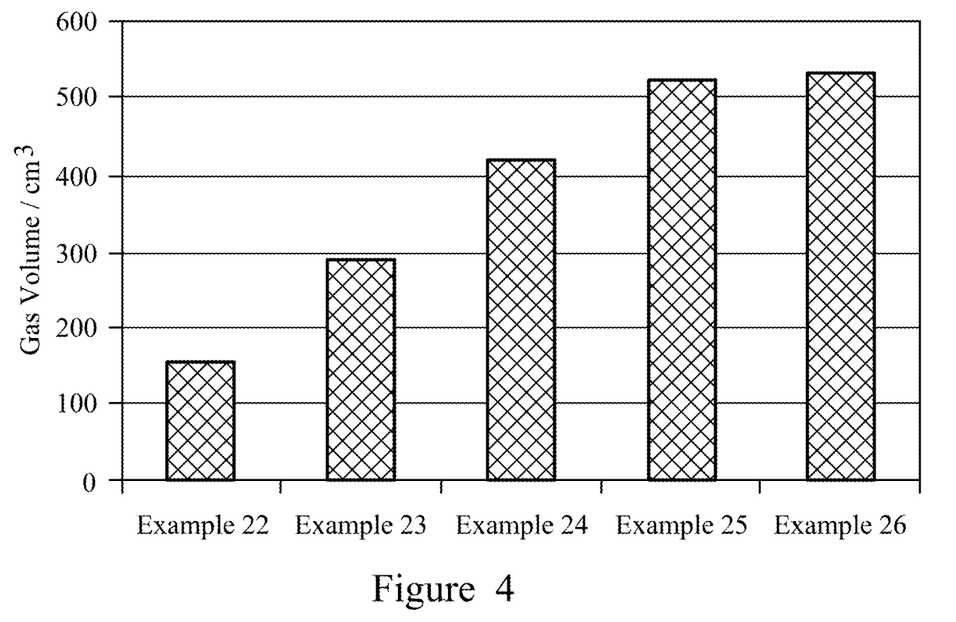
FIG. 4 is a graph showing gas volume generated for Examples 22 to 26.

Results are provided in FIG. 4, from which it is noted that there is no significant improvement in gas generation beyond 20 mmol sulfamic acid, implying a preferred ammonium bicarbonate to sulfamic acid ratio of 1:2.

EXAMPLES 27 TO 30

The effect of varying the molar quantity of sodium nitrite when reacted with ammonium bicarbonate and sulfamic acid was investigated using the general procedure described in Example 1 and the reagents provided in the table below.

| Example No. | Ammonium bicarbonate mmol | Sulfamic acid mmol | Sodium nitrite mmol |
|---|---|---|---|
| 27 | 10 | 20 | 20 |
| 28 | 10 | 20 | 30 |
| 29 | 10 | 20 | 40 |
| 30 | 10 | 20 | 50 |

Figure 5:
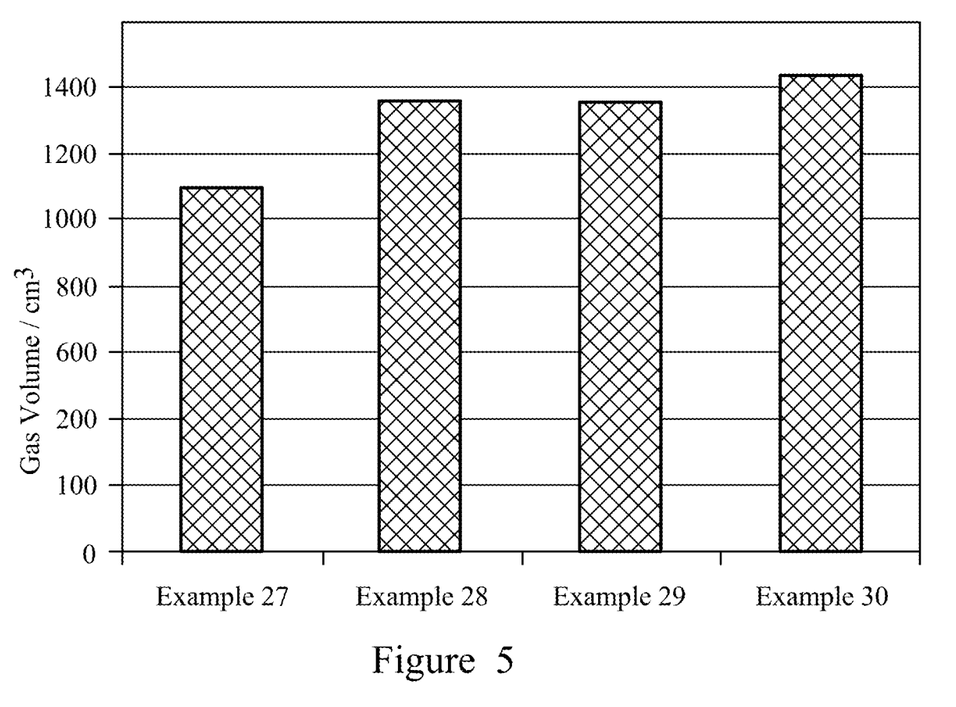
FIG. 5 is a graph showing gas volume generated for Examples 27 to 30.

Results are provided in FIG. 5, from which it is noted that there is limited increase in gas release beyond 30 mmol NaNO$_2$. Therefore 30 mmol was chosen as the preferred quantity of nitrite for reaction efficiency reasons, implying a preferred nitrite to ammonium bicarbonate ratio of 3:1 and a nitrite to acid ratio of 1.5:1

In Example 31, the minimum quantity of hydrochloric acid needed to cause a reaction involving ammonium bicarbonate to go to completion was investigated.

EXAMPLE 31

The general procedure of Example 1 was used to investigate the following reaction.

10 mmol NH$_4$HCO$_3$ and 25 mmol NaNO$_2$ were used with a range of acid concentrations. Gas volume was measured as a function of time and the results are provided in the table below.

| | Quantity of HCl | | | | | | | | |
|---|---|---|---|---|---|---|---|---|---|
| Time/mins | 0 mmol | 1 mmol | 2.5 mmol | 5 mmol | 10 mmol | 15 mmol | 16 mmol | 17.5 mmol | 20 mmol |
| 0 | 0 | 0 | 0 | 0 | 0 | 0 | 0 | 0 | 0 |
| 0.5 | 25 | 52 | 78 | 195 | 265 | 360 | 345 | 410 | 460 |
| 1 | 49 | 90 | 108 | 210 | 280 | 440 | 420 | 465 | 515 |

-continued

| | Quantity of HCl | | | | | | | | |
|---|---|---|---|---|---|---|---|---|---|
| Time/ mins | 0 mmol | 1 mmol | 2.5 mmol | 5 mmol | 10 mmol | 15 mmol | 16 mmol | 17.5 mmol | 20 mmol |
| 2.5 | 138 | 170 | 190 | 260 | 305 | 510 | 515 | 545 | 565 |
| 5 | 212 | 230 | 241 | 302 | 365 | 530 | 540 | 560 | 565 |
| 10 | 231 | 233 | 248 | 305 | 428 | 540 | 540 | 560 | 565 |
| 15 | 232 | 233 | 248 | 310 | 452 | 540 | 540 | 560 | 565 |
| 20 | 232 | 233 | 248 | 310 | 467 | 540 | 540 | 560 | 565 |
| 30 | 232 | 233 | 248 | 310 | 480 | 540 | 540 | 560 | 565 |

Figure 6:
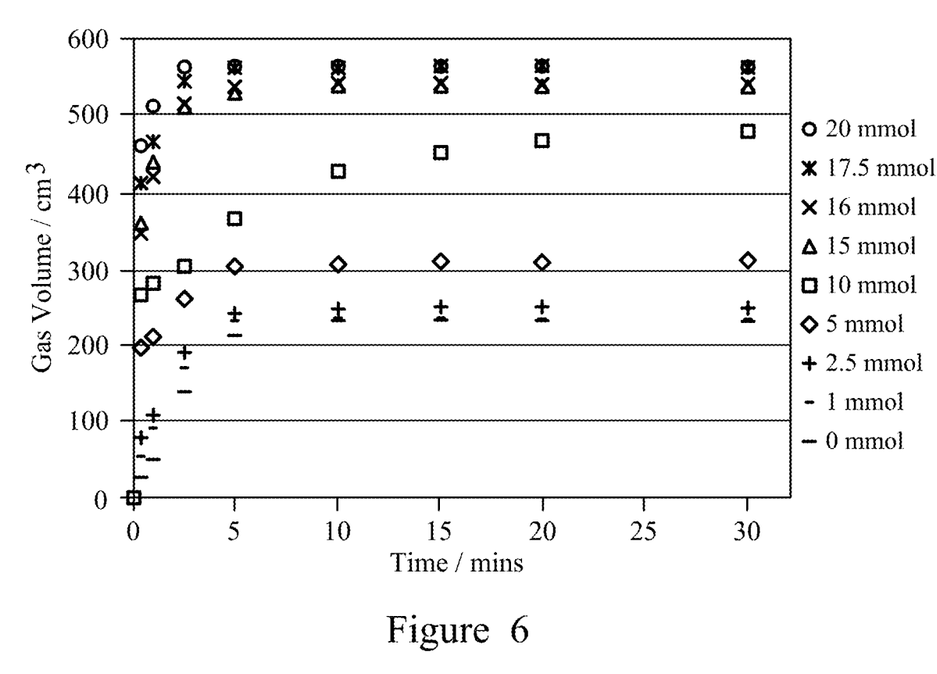
FIG. 6 is a graph showing gas volume generated for Example 31.

Results are also shown in FIG. 6.

The results show that, in the reaction, approximately 16 mmol is the lowest acid concentration at which the reaction goes to completion; and completion is within about 5 minutes.

In Example 32, the minimum quantity of sulfamic acid needed to cause a reaction involving ammonium carbonate to go to completion was investigated.

EXAMPLE 32

The general procedure of Example 1 was used to investigate the following reaction.

$$NH_4HCO_3 + H_3NSO_3 + 2NaNO_2 \rightarrow Na_2SO_4 + 2N_2 + CO_2 + 4H_2O$$

10 mmol $NH_4HCO_3$ and 30 mmol $NaNO_2$ were used with a range of acid concentrations. Gas volume was measures as a function of time and the results are provided in the table below.

| | Quantity of sulfamic acid | | | |
|---|---|---|---|---|
| Time/mins | 5 mmol | 10 mmol | 15 mmol | 20 mmol |
| 0 | 0 | 0 | 0 | 0 |
| 0.5 | 300 | 540 | 1020 | 1360 |
| 1 | 344 | 550 | 1020 | 1360 |
| 2.5 | 448 | 550 | 1020 | 1360 |
| 5 | 516 | 550 | 1020 | 1360 |
| 10 | 524 | 550 | 1020 | 1360 |
| 15 | 524 | 550 | 1020 | 1360 |
| 20 | 524 | 550 | 1020 | 1360 |
| 30 | 524 | 550 | 1020 | 1360 |

Figure 7:
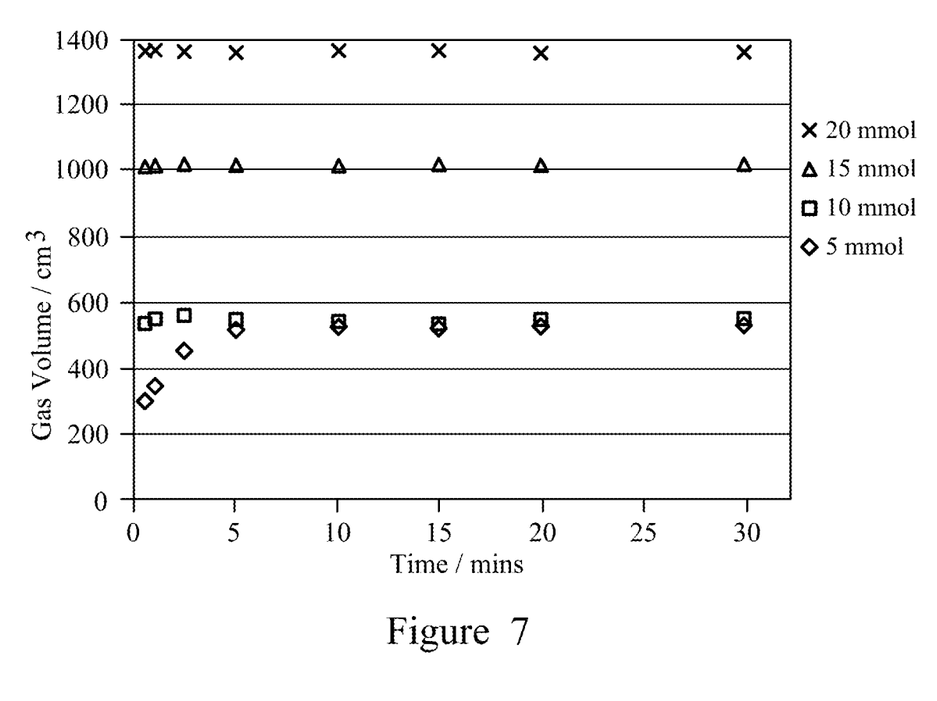
FIG. 7 is a graph showing gas volume generated for Examples 32.

Results are shown in FIG. 7.

The results show that, using sulfamic acid, reactions involving ammonium carbonate and sulfamic acid are complete within seconds.

The reagents described herein may be used in treatment of a formation as described. Reagents may be delivered in receptacles to a well-head for subsequent injection, for example using coiled tubing as described herein, into the formation. Exemplary compositions including concentrations and amounts in pound (lb) are detailed in the table below. Pounds (lb) can be converted to kg by multiplication by 0.45.

| Composition | Acid | Acid conc/M | Mass of acid/lb | Amount of $NH_4HCO_3$/lb | Amount $NaNO_2$ solution/lb |
|---|---|---|---|---|---|
| A | HCl | 12.00 | 9915 lb 37% HCl | 3911 | 8534 |
| B | Sulfamic | 2.11 | 6202 | 2519 | 6596 |
| C | Ammonium bisulfate | 8.33 | 10828 | 3720 | 9739 |
| D | Sulfamic + ammonium bisulfate (75:25) | 1.88 / 0.63 | $H_3NSO_3$ = 4994 / $NH_4HSO_4$ = 1984 | 2704 | 7079 |
| E | Sulfamic + ammonium bisulfate (50:50) | 1.67 / 1.67 | $H_3NSO_3$ = 3687 / $NH_4HSO_4$ = 4371 | 2996 | 7844 |
| F | Sulfamic + ammonium bisulfate (25:75) | 1.28 / 3.85 | $H_3NSO_3$ = 2072 / $NH_4HSO_4$ = 7388 | 3379 | 8848 |
| G | Sulfamic ammonium bisulfate (10:90) | 0.71 / 6.43 | $H_3NSO_3$ = 885 / $NH_4HSO_4$ = 9496 | 3622 | 9484 |

\* The Ammonium Bicarbonate was made up to a 0.8M aqueous solution
\*\* The Sodium Nitrite was made up to a 2.40M aqueous solution The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of treating a subterranean formation to generate gas within the formation so as to undertake a 'Huff and Puff' operation or reduce proppant settling, the method comprising:
   (A) undertaking a 'Huff and Puff' operation which comprises a first step (i) of placing gas generating chemicals within a wellbore of a subterranean formation and reacting the gas generating chemicals, wherein the gas generating chemicals comprise
      (a) ammonium bicarbonate;
      (b) an oxidizing agent selected from a perchlorate or a nitrite or combinations thereof; and
      (c) an acid (AA);
   and a second 'shut-in' step (ii) wherein the well is sealed; wherein the subterranean formation comprises shale, sandstone, limestone, or mixtures thereof; or
   (B) reducing proppant settling which comprises a step of contacting a subterranean formation with the following:

(a) ammonium bicarbonate;
(b) an oxidizing agent selected from a perchlorate or a nitrite or combinations thereof; and
(c) an acid (AA);
wherein said ammonium bicarbonate and said oxidizing agent are contacted so that they react and nitrogen and carbon dioxide are generated in the formation;
and a step of introducing a proppant and/or a microproppant into the formation;
wherein the subterranean formation comprises shale, sandstone, limestone, or mixtures thereof.

2. The method according to claim 1, wherein said oxidizing agent is a nitrite and a ratio (A) defined as the number of moles of ammonium bicarbonate divided by the number of moles of nitrite contacted with the formation is in the range 0.1 to 2.0.

3. The method according to claim 2, wherein said oxidizing agent comprises sodium nitrite.

4. The method according to claim 2, wherein said ratio (A) is in the range 0.3 to 0.6.

5. The method according to claim 2, wherein said ammonium bicarbonate is provided as an aqueous solution of ammonium bicarbonate; wherein said oxidizing agent is a nitrite and is provided in aqueous solution; and said acid (AA) is provided as an aqueous solution or slurry of acid (AA).

6. The method according to claim 2, wherein:
said ammonium bicarbonate and said oxidizing agent are contacted so they react and nitrogen and carbon dioxide are generated in the formation;
said acid (AA) reacts to produce a gas, wherein the gas produced includes carbon and/or nitrogen atoms originating in the acid (AA);
said ratio (A) is in the range 0.3 to 0.6; and
said acid (AA) is selected from sulfamic acid and ammonium bisulfate; and mixtures of sulfamic acid and ammonium bisulfate.

7. The method according to claim 6, wherein:
the sum of the total weight in grams (g) of ammonium bicarbonate, said nitrite, and acid(s) introduced into the formation is herein referred to as SUM-W;
the sum of the total volume in $cm^3$ of gas generated by reaction of ammonium bicarbonate, nitrite and said acid(s) is herein referred to as SUM-V;
in the method, the Reaction Efficiency is defined as SUM-V divided by SUM-W; and
the Reaction Efficiency is at least 100 $cm^3/g$ and is less than 300 $cm^3/g$.

8. The method according to claim 1, wherein said ammonium bicarbonate and said oxidizing agent are contacted so they react and nitrogen and carbon dioxide are generated in the formation and wherein said acid (AA) reacts to produce a gas, wherein the gas produced includes carbon and/or nitrogen atoms originating in the acid (AA).

9. The method according to claim 1, wherein said acid (AA) is selected from sulfamic acid and ammonium bisulfate; and mixtures of sulfamic acid and ammonium bisulfate.

10. The method according to claim 1, wherein a ratio (B) defined as the number of moles of ammonium bicarbonate divided by the total number of moles of acid contacted with the formation is in the range 0.3 to 0.6.

11. The method according to claim 9, wherein a ratio (E) defined as the number of moles of ammonium bicarbonate divided by the sum of the number of moles of sulfamic acid and ammonium bisulfate contacted with the formation is in the range 0.3 to 0.6; and/or wherein a ratio (F) defined as the number of moles of ammonium bicarbonate divided by the number of moles of sulfamic acid contacted with the formation is in the range 0.3 to 0.6; and/or
wherein a ratio (G) defined as the number of moles of ammonium bicarbonate divided by the number of moles of ammonium bisulfate contacted with the formation is in the range 0.3 to 0.6; and/or
wherein a ratio (K) defined as the number of moles of nitrite divided by the sum of the number of moles of sulfamic acid and ammonium bisulfate contacted with the formation to produce a gas is in the range 1.3 to 1.7.

12. The method according to claim 1, wherein:
said oxidizing agent is a nitrite;
the sum of the total weight in grams (g) of ammonium bicarbonate, said nitrite and acid(s) introduced into the formation is herein referred to as SUM-W;
the sum of the total volume in $cm^3$ of gas generated by reaction of ammonium bicarbonate, nitrite and said acid(s) is herein referred to as SUM-V;
wherein, in the method, the Reaction Efficiency is defined as SUM-V divided by SUM-W;
wherein the Reaction Efficiency is at least 100 $cm^3/g$ and is less than 300 $cm^3/g$.

13. The method according to claim 1, comprising treating said subterranean formation to generate gas within the formation so as to undertake a 'Huff and Puff' operation.

14. The method according to claim 1, comprising treating said subterranean formation to generate gas within the formation so as to reduce proppant settling.

15. A method of treating a subterranean formation to generate gas within the formation so as to undertake a 'Huff and Puff' operation or reduce proppant settling, the method comprising:
(A) undertaking a 'Huff and Puff' operation which comprises a first step (i) of placing gas generating chemicals within a wellbore of a subterranean formation and reacting the gas generating chemicals, wherein the gas generating chemicals comprise
(a) ammonium bicarbonate;
(b) an oxidizing agent which is a nitrite; and
(c) an acid (AA);
and a second 'shut-in' step (ii) wherein the well is sealed;
wherein the subterranean formation comprises shale, sandstone, limestone, or mixtures thereof;
wherein a ratio (A) defined as the number of moles of ammonium bicarbonate divided by the number of moles of nitrite contacted with the formation and/or reacted in the formation is in the range 0.1 to 2.0; and
wherein said ammonium bicarbonate and said oxidizing agent are contacted so they react and nitrogen and carbon dioxide are generated in the formation; or
(B) reducing proppant settling which comprises a step of contacting a subterranean formation with the following:
(a) ammonium bicarbonate;
(b) an oxidizing agent which is a nitrite; and
(c) an acid (AA);
and a step of introducing a proppant and/or a microproppant into the formation;
wherein the subterranean formation comprises shale, sandstone, limestone, or mixtures thereof;
wherein a ratio (A) defined as the number of moles of ammonium bicarbonate divided by the number of moles of nitrite contacted with the formation and/or reacted in the formation is in the range 0.1 to 2.0; and wherein said ammonium bicarbonate and said oxidizing agent are contacted so they react and nitrogen and carbon dioxide are generated in the formation.

16. The method according to claim 15, comprising treating said subterranean formation to generate gas within the formation so as to undertake a 'Huff and Puff' operation.

17. The method according to claim 15, comprising treating said subterranean formation to generate gas within the formation so as to reduce proppant settling.

18. A method of treating a subterranean formation to generate gas within the formation, the method comprising:

(A) undertaking a 'Huff and Puff' operation which comprises a first step (i) of placing gas generating chemicals within a wellbore of a subterranean formation and reacting them and a second 'shut-in' step (ii) wherein the well is sealed; or (B) reducing proppant settling which comprises a step of introducing a proppant and/or a microproppant into a subterranean formation;

the method comprising contacting the formation with the following:

(a) ammonium bicarbonate;
(b) an oxidizing agent which is a nitrite; and
(c) an acid (AA);

wherein said ammonium bicarbonate and said oxidizing agent are contacted so that they react and nitrogen and carbon dioxide are generated in the formation;

wherein the generated gas provides conditions for undertaking said 'Huff and Puff' operation or reducing proppant settling; and wherein the subterranean formation comprises shale, sandstone, limestone, or mixtures thereof.

19. A method according to claim 18, wherein a ratio (A) defined as the number of moles of ammonium bicarbonate divided by the number of moles of nitrite contacted with the formation and/or reacted in the formation is in the range 0.1 to 2.0.

20. The method according to claim 18, comprising treating said subterranean formation to generate gas within the formation so as to undertake a 'Huff and Puff' operation.

21. The method according to claim 18, comprising treating said subterranean formation to generate gas within the formation so as to reduce proppant settling.

* * * * *